(12) United States Patent
Plote et al.

(10) Patent No.: US 7,082,752 B2
(45) Date of Patent: Aug. 1, 2006

(54) METHOD AND DEVICE FOR MONITORING AN EXHAUST GAS TREATMENT SYSTEM

(75) Inventors: Holger Plote, Ermsdorf (AT); Andreas Krautter, Steinheim (DE); Michael Walter, Kornwestheim (DE); Juergen Sojka, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 10/472,356

(22) PCT Filed: Feb. 26, 2002

(86) PCT No.: PCT/DE02/00697

§ 371 (c)(1),
(2), (4) Date: Feb. 13, 2004

(87) PCT Pub. No.: WO02/075128

PCT Pub. Date: Sep. 26, 2002

(65) Prior Publication Data

US 2004/0112044 A1 Jun. 17, 2004

(30) Foreign Application Priority Data

Mar. 17, 2001 (DE) .......................... 101 13 010

(51) Int. Cl.
*F01N 3/00* (2006.01)

(52) U.S. Cl. .............................. 60/277; 60/274; 60/276; 60/285

(58) Field of Classification Search ................... 60/274, 60/276, 277, 285, 286; 73/23.25, 118.1
See application file for complete search history.

(56) References Cited

U.S. PATENT DOCUMENTS

| 5,133,184 | A | | 7/1992 | Geiger | |
|---|---|---|---|---|---|
| 5,201,802 | A | * | 4/1993 | Hirota et al. ................. | 60/276 |
| 5,592,815 | A | | 1/1997 | Schultalbers et al. | |
| 5,626,014 | A | * | 5/1997 | Hepburn et al. .............. | 60/274 |
| 5,630,315 | A | * | 5/1997 | Theis .......................... | 60/274 |
| 5,706,652 | A | * | 1/1998 | Sultan .......................... | 60/274 |
| 5,842,341 | A | * | 12/1998 | Kibe ............................ | 60/274 |
| 6,079,203 | A | * | 6/2000 | Wakamoto ................... | 60/274 |
| 6,145,302 | A | * | 11/2000 | Zhang et al. ................. | 60/274 |
| 6,202,406 | B1 | * | 3/2001 | Griffin et al. ................. | 60/274 |
| 6,408,616 | B1 | * | 6/2002 | Mazur et al. ................. | 60/277 |

FOREIGN PATENT DOCUMENTS

| DE | 199 06 287 | 8/2000 |
|---|---|---|
| DE | 69629870 | 7/2004 |
| EP | 0609527 | 8/1994 |
| EP | 1 052 385 | 11/2000 |
| JP | 10-306718 | 11/1998 |

OTHER PUBLICATIONS

SAE International No. 932854.

* cited by examiner

*Primary Examiner*—Tu M. Nguyen
(74) *Attorney, Agent, or Firm*—Kenyon & Kenyon

(57) ABSTRACT

A method and a device for monitoring an exhaust gas aftertreatment system, in particular an oxidation catalytic converter, are described. An error is recognized if an operating parameter does not change as expected, when a particular operating state is present.

8 Claims, 2 Drawing Sheets

METHOD AND DEVICE FOR MONITORING AN EXHAUST GAS TREATMENT SYSTEM

FIELD OF THE INVENTION

The present invention relates to a method and a device for monitoring an exhaust gas aftertreatment system.

BACKGROUND INFORMATION

A method and a device for controlling an exhaust gas aftertreatment system are known from German Patent 199 062 87. In the system described therein, a particle filter is used which filters out particles contained in the exhaust gas. This particle filter must be regenerated at regular intervals. To this end, provision is made for increasing the exhaust gas temperature and thereby initiating burnup of the particles. An oxidation catalytic converter is usually used to increase the exhaust gas temperature. For the regeneration, there is provision for the introduction of hydrocarbons into the exhaust gas, which then react in the oxidation catalytic converter and lead to an increase in the exhaust gas temperature.

Very high demands for effectiveness and availability are placed on such an exhaust gas aftertreatment system. The effectiveness of the oxidation catalytic converter decreases with its length of use. The degradation of the effectiveness is dependent on the quality of the oxidation layer, and above all on the prevailing operating states, and is thus unpredictable. In order to prevent failure and/or deterioration of the operation of the oxidation catalytic converter, and accordingly to recognize a possible increase in emissions, checking of the oxidation catalytic converter is necessary.

SUMMARY OF THE INVENTION

Due to the fact that an error is recognized if, when a particular operating state is present, an operating parameter does not change as expected, it is possible to monitor the functionality of an exhaust gas aftertreatment system during vehicle operation.

It is especially advantageous that a check is performed when an afterinjection that affects the temperature is made, to determine whether the operating parameter changes as expected. Here an error is recognized if this operating parameter does not change as expected. This means that an afterinjection affecting the temperature is recognized in the particular operating state. An afterinjection affecting the temperature is recognized in particular if the quantity of fuel NE apportioned in the afterinjection and/or the beginning of the afterinjection BNE lie within certain ranges. That ensures that the afterinjection makes a contribution to increasing the exhaust gas temperature.

It is especially advantageous that an error-free exhaust gas aftertreatment system is recognized if, when the particular operating state exists within a certain period of time, a first operating parameter changes as expected and a second operating parameter remains nearly constant.

Preferably, an error-free exhaust gas aftertreatment system is recognized if, when an afterinjection is present within a certain period of time, the temperature downstream from the exhaust gas aftertreatment system being monitored changes as expected and the temperature upstream from the exhaust gas aftertreatment system being monitored remains nearly constant.

As a result, no additional sensors or other hardware components are necessary. It is possible to recognize a reduction of the effectiveness or total failure of the exhaust gas aftertreatment system early.

The diagnosis is interrupted if the operating state ends, since in that case reliable recognition of error and/or intactness is no longer possible.

It is especially advantageous if a diagnosis is performed if the operating state is present, a minimum waiting time has passed since the last diagnosis, and/or a minimum waiting time has passed since the last interruption of the diagnosis. That makes it possible to ensure that the diagnosis is made only in defined operating states.

DETAILED DESCRIPTION

Figure 1:
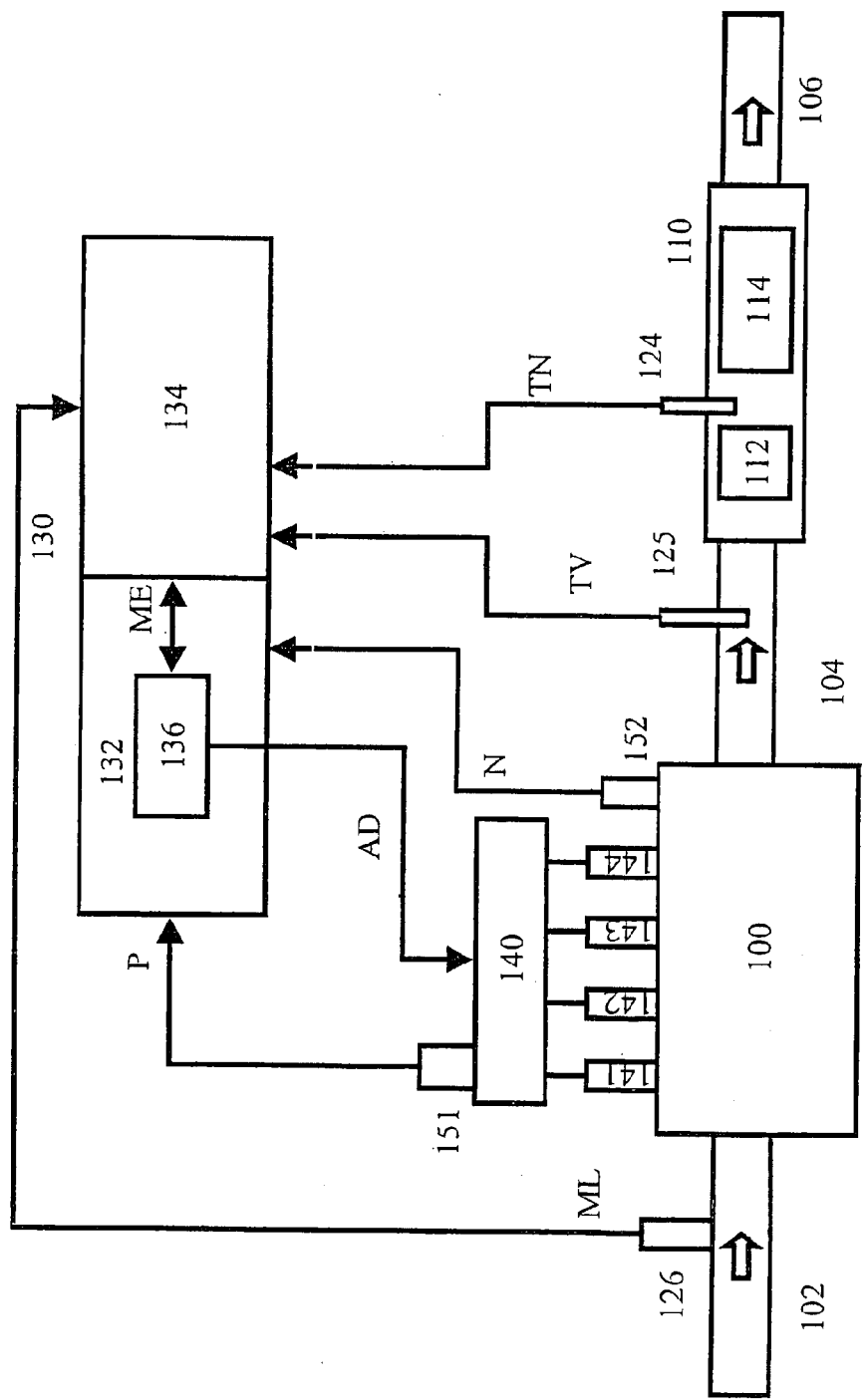
FIG. 1 shows a block diagram of the device according to the present invention.

The method according to the present invention is described below using an oxidation catalytic converter as an example. However, the method is not limited to use with oxidation catalytic converters, and it may be used with all exhaust gas aftertreatment systems in which a correlation exists between a particular operating state and an associated change in an operating parameter due to the effect of the exhaust gas aftertreatment system.

Especially advantageous is the use of the method in an exhaust gas aftertreatment system that includes an oxidation catalytic converter and a downstream particle filter.

The device according to the present invention is illustrated below using an auto-ignition internal combustion engine as an example, in which the fuel metering is controlled by a common rail system. However, the method according to the present invention is not limited to these systems, and it may be used in other internal combustion engines as well.

An internal combustion engine designated by reference number 100 receives fresh air supplied via an intake line 102 and discharges exhaust gases via an exhaust line 104. Exhaust gas aftertreatment means 110 are situated in exhaust line 104 from where the purified exhaust gases are released to the atmosphere via line 106. Exhaust gas aftertreatment means 110 essentially include a precatalyst 112 and a filter 114 downstream therefrom. A temperature sensor 124 is preferably situated between precatalyst 112 and filter 114 which provides a temperature signal TN. In addition, positioned upstream from precatalyst 112, there is a temperature sensor 125 that supplies a temperature signal TV.

In an advantageous embodiment, there may also be provision for one and/or both temperature signals to be calculated and/or simulated on the basis of other operating parameters.

There may also be a sensor 126 positioned in intake line 102, that registers a signal which characterizes the quantity ML of fresh air supplied. An air flow meter is utilized for this purpose.

Fuel is metered to internal combustion engine 100 via a fuel metering device 140. The fuel metering device meters fuel to the individual cylinders of internal combustion engine 100 via injectors 141, 142, 143, and 144. The fuel metering device is preferably a common rail system. A high-pressure pump conveys fuel to an accumulator. From the accumulator, the fuel enters the internal combustion engine via the injectors.

Various sensors are situated on fuel metering device 140 which provide signals that characterize the state of the fuel metering device. For a common rail system, for example, this involves pressure P in the accumulator. Sensors 152 are situated on internal combustion engine 100 which characterize the state of the internal combustion engine. This involves, for example, a rotational speed sensor which provides a rotational speed signal N, and other sensors, which are not shown.

The output signals from these sensors reach a control 130, which is illustrated as a first partial control 132 and a second partial control 134. Preferably, the two partial controls form a structural unit. First partial control 132 preferably actuates fuel metering device 140 with actuating signals AD which influence the fuel metering. To this end, first partial control 132 contains an engine control 136. The engine control transmits a signal ME, which characterizes the quantity to be injected, to second partial control 134.

Second partial control 134 preferably controls the exhaust gas aftertreatment system, and to this end detects the corresponding sensor signals. In addition, second partial control 134 exchanges signals, in particular regarding the quantity of fuel ME injected, with first partial control 32. The two controls preferably make mutual use of the sensor signals and the internal signals.

The first partial control, also referred to as engine control 132, controls actuating signal AD for actuating fuel metering device 140 as a function of various signals which characterize the operating state of internal combustion engine 100, the state of fuel metering device 140, and the ambient condition, in addition to a signal which characterizes the desired power and/or torque from the internal combustion engine. Such devices are known, and are used in a variety of ways.

Particle emissions may appear in the exhaust gas, in particular with diesel engines. To this end, exhaust gas aftertreatment means 110 filter these particles from the exhaust gas. Particles accumulate in filter 114 as a result of this filtering process. To clean the filter, these particles are then combusted in specified operating states, load states, and/or after specified times or counter positions have passed for quantity of fuel or the distance traveled. Filter 114 is usually regenerated by increasing the temperature in exhaust gas aftertreatment means 110 until the particles combust.

Precatalyst 112 is provided for raising the temperature. The temperature is raised by, for example, increasing the proportion of uncombusted hydrocarbons in the exhaust gas. These uncombusted hydrocarbons then react in precatalyst 112 and raise the temperature of the precatalyst, and thus also that of the exhaust gas that enters filter 114.

The core of the present invention may be seen in the fact that oxidation of intentionally added hydrocarbons at the catalytic coating of the catalytic converter is recognized due to the temperature increase resulting from the exothermal reaction. It is possible thereby to recognize a deteriorating oxidation catalytic converter early on the basis of a reduced increase in temperature.

For error recognition, only a temperature sensor upstream from and a temperature sensor downstream from the oxidation catalytic converter are needed. In a vehicle having a particle filter, no high cost for hardware results, since the temperature sensors are already provided for the targeted regeneration control of the particle filter.

The diagnosis of the oxidation catalytic converter is based on evaluating the temperature behavior upstream from and downstream from the catalytic converter in the event that a regeneration of the particle filter is to be initiated. For the regeneration it is necessary to increase the exhaust gas temperature, in order to oxidize the particles of soot that have become deposited in the filter. Usually, to do this the exhaust gas is enriched with hydrocarbons, which react exothermally when a certain temperature at the oxidation catalytic converter is exceeded. It is possible to accomplish this for example with a late afterinjection, as well as with an adsorbed afterinjection.

Figure 2:
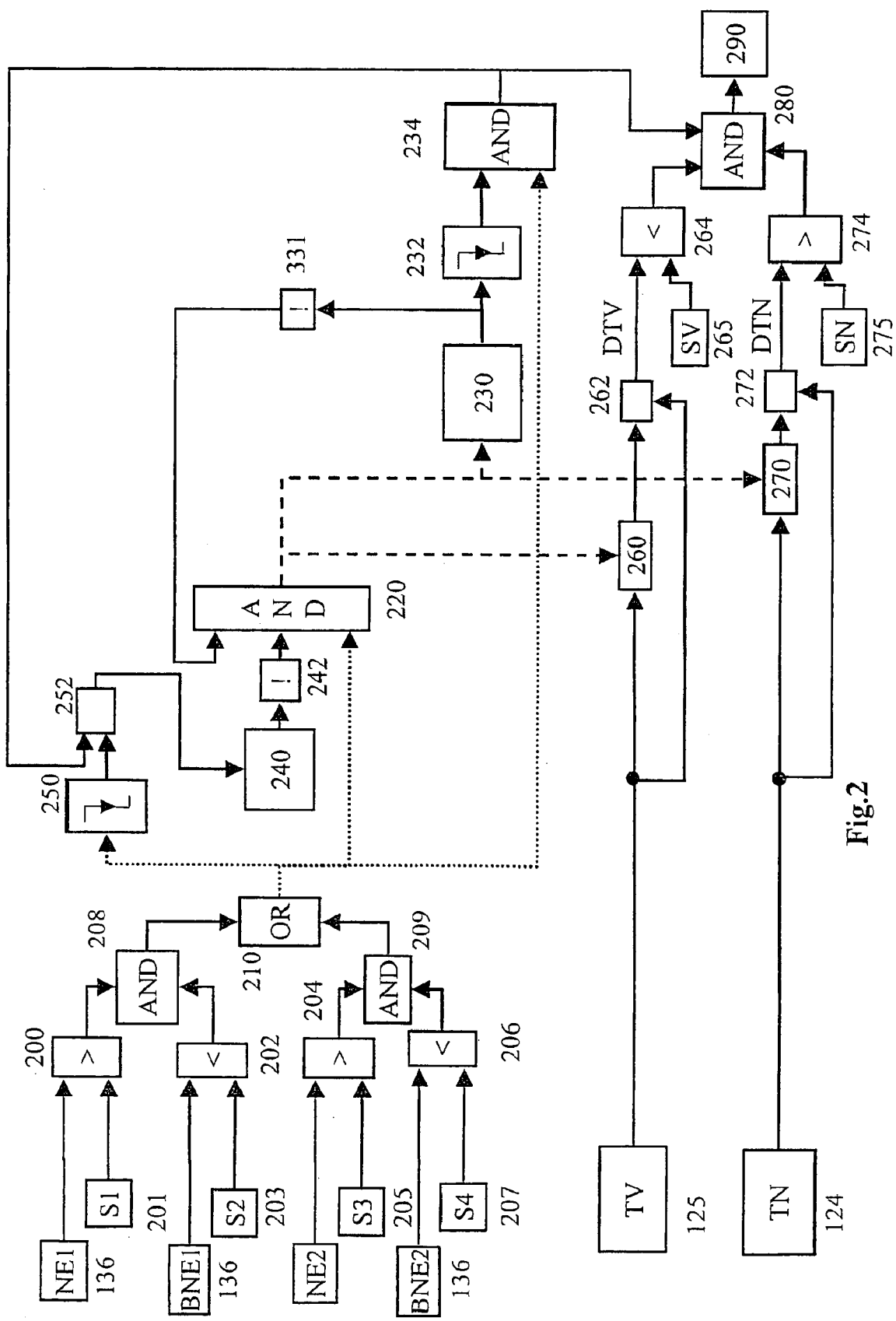
FIG. 2 shows a flow chart of the method according to the present invention.

In FIG. 2, the corresponding method is described on the basis of a flow chart. The method according to the present injection is described using the example of an oxidation catalytic converter for a particle filter in a diesel engine, where one or two afterinjections may be provided to increase the temperature. The method according to the present injection is not limited to this application, however. It may be used with all systems in which a temperature increase is effected in the exhaust gas aftertreatment system through appropriate specification of control signals. Instead of the temperature, other signals that characterize the functioning of the exhaust gas aftertreatment system may also be evaluated. Furthermore, the method is not limited to oxidation catalytic converters, but may always be utilized with exhaust gas aftertreatment systems.

Engine control 136 predefines first signals NE1, which characterize the injection quantity of a first afterinjection, and/or signals BNE1, which characterize the beginning of the first afterinjection, and signals NE2 and/or BNE2, which characterize the injection quantity and/or the beginning of a second afterinjection. Signals NE1 arrive at a comparator 200, at whose second input output signal S1 from a first threshold value specifier 201 is present. In addition, signal BNE1 arrives at a second comparator 202, at whose second input output signal S2 from a second threshold value specifier 203 is present. The output signals from first comparator 200 and second comparator 202 pass via an AND gate 208 and arrive at an OR gate 210.

Signal NE2 arrives at a comparator 204, at whose second input output signal S3 from a third threshold value specifier 205 is present. In addition, signal BNE2 arrives at a second comparator 206, at whose second input output signal S4 from a fourth threshold value specifier 207 is present. The output signals from comparator 204 and comparator 206 pass via an AND gate 209 and arrive at an OR gate 210.

The output signal from OR gate 210 arrives at a fall-off detection device 250, at an AND gate 220, and at another AND gate 234. AND gate 220 applies a start signal to a timer 230, among other things. Timer 230, in turn, operating through a negating element 331, acts on an input of AND gate 220 and on a fall-off detection device 232. Fall-off detection device 232, in turn, acts on the second input of AND gate 234. The output signal of AND gate 234 acts on an intact recognition element 290.

Present at another input of AND gate 220 is an output signal from a negating element 242, which is acted on in turn by a second timer 240. Timer 240 is started by a signal from an OR gate 252, which is acted on by fall-off detection device 250 and by AND gate 234.

Output signal TV from temperature sensor 125 arrives at a memory element 260 and at a subtraction element 262. Temperature signal TV is written to memory element 260, if the output signal from AND gate 220 is "true." Output signal DTV from subtraction element 262 arrives at a comparator 264, at whose second input output signal SV from a threshold value specifier 265 is present. The output signal of comparator 264 acts on an AND gate 280, which in turn acts on intact recognition element 290.

Output signal TN from temperature sensor 124 arrives at a memory element 270 and at a subtraction element 272. Temperature signal TN is written to memory element 270, if the output signal from AND gate 220 is reporting "true." Output signal DTN from subtraction element 272 arrives at a comparator 264, at whose second input output signal SN from a threshold value specifier 275 is present. The output signal of comparator 274 acts on AND gate 280, which in turn acts on intact recognition element 290.

This device works as follows. Comparator 200 checks whether the injection quantity of first afterinjection NE1 is greater than a first threshold value. Correspondingly, second comparator 202 checks whether injection beginning BNE1 of the first afterinjection is smaller than a second threshold value S2. There is a signal present at the output of AND gate 208 if injection quantity NE1 of the first afterinjection is greater than threshold value S1 and the beginning of injection is later than a second threshold value S2. That is, a signal is present if an afterinjection affecting the temperature is present. Correspondingly, there is a signal at second AND gate 209 if fuel quantity NE2 and injection beginning BNE2 of a second afterinjection are greater and later, respectively, than threshold values S3 and S4. There is a signal present at the output of OR gate 210, if a first afterinjection NE1 or a second afterinjection NE2 has been recognized.

In a simplified embodiment which is utilized in particular in systems with only one afterinjection, elements 204 through 209 are omitted.

If this is the case, that is, an afterinjection affecting the temperature is present, and if additional conditions that are checked by AND gate 220 are fulfilled, first timer 230 is started and the current value of temperature TV is stored in memory 260. Correspondingly, the current value of temperature TN is stored in memory 270.

As a second condition, AND gate 220 checks whether a second timer 240 has been started.

This second timer 240 is started when the check is ended, or when the afterinjection is no longer present; that is, it is ended. The end of the afterinjection is recognized by fall-off detection device 250. A signal that indicates that a check has just been performed is present at the output of AND gate 234. These two signals are linked through OR gate 252. If one of these signals is present, timer 240 is started, which prevents the test from being performed again before a minimum time has passed. This is accomplished by having AND gate 220 check, as a further condition, whether timer 230 is already running. If so, the timer is also not restarted and the test is not performed.

If timer 230 has run out and an afterinjection is still present, this is recognized by fall-off detection device 232 and AND gate 234; in that case a check is performed of whether the temperature signals have changed since first timer 230 was started. To this end, subtraction elements 262 and 272 determine the difference between the current temperature values and the temperature values stored when the timer was started. These are then compared with threshold values in comparators 264 and 274.

If the change in temperature TV upstream from the oxidation catalytic converter is smaller than threshold value SV, and if the temperature change downstream from the oxidation catalytic converter is greater than threshold value SN, intact recognition element 290 recognizes an error-free oxidation catalytic converter.

The diagnosis of the oxidation catalytic converter is based on the recognition of at least one of the two afterinjections. Immediately after the activation of one of the afterinjections, the temperatures upstream and downstream from the oxidation catalytic converter are stored and first timer 230 is started. After first timer 230 has run out, differences DTV and DTN between the stored and the current temperatures are determined. If this difference downstream from the oxidation catalytic converter has exceeded a predefinable magnitude SN, the oxidation catalytic converter is recognized as sufficiently functional. This occurs only if the afterinjections are active without interruption during the entire timing period of first timer 230, and the temperature difference upstream from the oxidation catalytic converter is smaller than threshold value SV.

The check of the temperature behavior upstream from the catalytic converter ensures that the temperature increases downstream from the catalytic converter are not attributable to an increase in load, and hence likewise to an increase in the temperature of the exhaust, but are actually caused by the exothermic reaction.

This means that a diagnosis is performed as long as the afterinjection is taking place and the temperature upstream from the exhaust gas aftertreatment system being checked only changes insignificantly. An error-free exhaust gas aftertreatment system is recognized if, with the afterinjection present, within a certain time period that is defined by first timer 230, the temperature downstream from the exhaust gas aftertreatment system that is being monitored rises and the temperature upstream from the exhaust gas aftertreatment system that is being monitored remains nearly constant.

With increasing aging of the catalytic converter, especially of the catalytic coating, the conversion rate of the hydrocarbons will be reduced, and thus the temperature increase will be less and less conspicuous, until it is less than the temperature gradient and consequently the catalytic converter is recognized as defective.

Deactivation of the afterinjection and/or of the afterinjections while timer 230 is running results in an interruption of the diagnostic function. At the same time, the second timer effects a timed blocking of the check until a new diagnosis is permissible, in order to ensure defined conditions again. The diagnosis is also blocked after conclusion of a diagnosis, by the output signal from AND gate 234.

This means that no diagnosis occurs, or the diagnosis is interrupted, if the afterinjection is absent, a minimum waiting time since the last diagnosis has not yet passed, and/or a minimum waiting time since the last interruption of the diagnosis has not yet passed.

What is claimed is:

1. A method of diagnosing an exhaust gas aftertreatment system positioned in an exhaust line of an internal combustion engine, comprising:

increasing a proportion of uncombusted hydrocarbons in the exhaust gas of the internal combustion engine by a fuel afterinjection;

measuring a first temperature of an exhaust gas upstream from the exhaust gas aftertreatment system by a first temperature sensor;

measuring a second temperature of the exhaust gas downstream from the exhaust gas aftertreatment system by a second temperature sensor;

providing a diagnosis by recognizing an error-free exhaust gas aftertreatment system if an expected temperature increase of the second temperature measured downstream from the exhaust gas aftertreatment system occurs because of the increase in the proportion of uncombusted hydrocarbons in the exhaust gas of the internal combustion engine; and providing the diagnosis only if the temperature upstream from the exhaust gas aftertreatment system as measured by the first temperature sensor only changes insignificantly within a period of time after the proportion of uncombusted hydrocarbons is increased.

2. The method as recited in claim 1, wherein:
the diagnosis is performed if at least one of a quantity of fuel metered in the fuel afterinjection and an injection time of the fuel afterinjection lies within certain respective ranges.

3. The method as recited in claim 1, wherein:
the method is applied to an oxidation catalytic converter located in the exhaust gas aftertreatment system.

4. The method as recited in claim 1, wherein:
the method is applied to a particle filter located in the exhaust gas aftertreatment system.

5. The method as recited in claim 1, further comprising:
interrupting the diagnosis if an operating state of the internal combustion engine changes before a conclusion of the diagnosis.

6. The method as recited in claim 5, wherein:
the diagnosis is performed if at least one of:
the operating state is present,
a minimum waiting time has passed since a last diagnosis, and
a minimum waiting time has passed since a last interruption of the diagnosis.

7. The method as recited in claim 1, wherein:
the diagnosis is performed if the fuel afterinjection affecting one of the first temperature and the second temperature is recognized.

8. The method as recited in claim 7, wherein:
the diagnosis is only performed if the fuel afterinjection is active without interruption during the period of time.

* * * * *